United States Patent [19]

Machino et al.

[11] Patent Number: 4,611,274
[45] Date of Patent: Sep. 9, 1986

[54] DATA TRANSMISSION SYSTEM VIA POWER SUPPLY LINE

[75] Inventors: Katsuyuki Machino, Nara; Masahiro Ise, Kashihara; Hidehiko Tanaka, Tenri, all of Japan

[73] Assignee: Sharp Kabushiki Kaisha, Osaka, Japan

[21] Appl. No.: 518,450

[22] Filed: Jul. 29, 1983

[30] Foreign Application Priority Data

Jul. 30, 1982 [JP] Japan .................. 57-133932

[51] Int. Cl.⁴ .................. G06F 13/38; H04J 3/02; H04J 3/16; H04Q 9/00
[52] U.S. Cl. .................. 364/200; 340/825.5; 340/310 R; 370/85; 370/96
[58] Field of Search ........... 340/825.5, 825.51, 310 A, 340/310 R; 370/85, 96; 364/200 MS File, 900 MS File

[56] References Cited

U.S. PATENT DOCUMENTS

| | | | |
|---|---|---|---|
| 4,063,220 | 12/1977 | Metcalfe et al. | 340/825.5 |
| 4,161,786 | 7/1979 | Hopkins et al. | 370/85 X |
| 4,377,804 | 3/1983 | Suzuki | 340/310 A |
| 4,379,294 | 4/1983 | Sutherland et al. | 340/825.5 |
| 4,429,299 | 1/1984 | Kabat et al. | 340/310 R |
| 4,439,856 | 3/1984 | Ulng | 370/85 |
| 4,447,872 | 5/1984 | Nothaft | 314/200 |

FOREIGN PATENT DOCUMENTS 57-67355  4/1982  Japan .................. 340/825.5

Primary Examiner—James D. Thomas
Assistant Examiner—Thomas Lee
Attorney, Agent, or Firm—Birch, Stewart, Kolasch & Birch

[57] ABSTRACT

This disclosure is directed to a data transmission system via the power supply line wherein it is characterized in that; it effectively controls branching terminal units connected to the CPU via the power supply line, by transmitting a high frequency AC signal that is mixed into the AC commercial frequency via the power supply line, while it normally surveilles the actual status of terminal units during normal operations. According to this system as a preferred embodiment of the present invention, after sampling data via the poling, a specific AC commercial frequency cyclic period can be allocated in order to properly transmit any emergency data between terminal units via a contention, and as a result, even in the slow-speed transmission line, not only any change of condition occurring in the terminal units can quickly be sent to the central processing unit, but all the control signals from the central processing unit can also be sent to respective terminal units without being held for waiting.

2 Claims, 9 Drawing Figures

DATA TRANSMISSION SYSTEM VIA POWER SUPPLY LINE

BACKGROUND OF THE INVENTION

The present invention relates to a data transmission system for transmitting data via the power supply line, which controls branching terminal units connected to the power supply line, while normally surveilling conditions of such terminal units, by transmitting high frequency AC signals to the AC commercial frequency in the power supply line and internally mixing them together.

Conventionally, any existing means for transmitting and receiving a data using signals synchronized with the AC commercial frequencies via the power supply line can be easily and correctly synchronized, while it can effectively offset any adverse effect from either noise or impedance occurring synchronous with the AC commercial frequencies, and as a result, it effectively stabilizes reliability on the data transmission system.

Conversely, since the data transmitting speed is largely limited by the existing AC commercial frequencies, all the data have to be transmitted at an extremely slow speed, i.e., 1 bit per cycle, and so a long period of time is required, for example, for collectively sampling data signals from many terminal units on line by poling.

FIG. 1 shows a simplified diagram of a conventional data transmission system via the power suuply line. Central processing unit (CPU) 1 transmits the control command to the terminal units 2 via the power supply line 3 by turning switches on and off to execute any designated operation, for example, On/Off operations for the power and illumination, or it usually surveys and displays operative conditions of respective terminal units 2, for example, existing conditions of the power source, illumination, or sensors, or alternatively, it causes an alarm to be generated in case of emergency. These terminal units 2 respectively incorporate the selfselective function so that they can enter operations only when specific signals are detected.

Actually, there are three signal transmission systems most widely made available. The first is contention system, by which signal transmission can be started upon contesting available channel lines as soon as such a need for signal transmission arises. The second is a time division stationary slot allocation system, which, as shown in FIG. 2, activates the CPU 1 to output a specific code H in order to establish a system synchronization before either transmitting or receiving data 21 through 25 to and from respective terminal units 2 via the preliminarily allocated slots. The third is a polling system, which, as shown in FIG. 3, activates the CPU 1 to output signals P1, P2, and P3, each containing an address signal, while any of the terminal units 2 selected by these signals can feed back any data such as D1, D2, and D3.

In regard to the first contention system, since there is no relationship of synchronization between the CPU 1 and the terminal units 2 and between these terminal units 2 themselves, signals from these may collide with each other, causing a state of confusion to occur and the entire system to eventually malfunction. If this occurs, since a considerable time must be spent before the normal condition is restored, the CPU 1 will be obliged to stop sending any control command until the entire system is back to the normally operative condition. If such a failure occurs, quick service advantages inherent to such a transmission system will be lost eventually.

The second system, which is the time division stationary slot allocation system, also requires a long time to collect sampling data in each cycle if a large number of terminal units 2 are employed, since the CPU 1 will also be obliged to stop sending the control command until the next data are completely collected.

Conversely, the third system which is the polling system can collect the sampling data within a very short while in each cycle without causing the CPU 1 to stop sending the control command without any waste of time.

On the other hand, if any change should take place in the status of these terminal units 2 immediately after the polling system has collected sampling data, such a change cannot be read by the CPU 1 until the sampling data has been collected from all the remaining terminal units 2. It requires a relatively long duration compared to other conventional systems.

OBJECT AND SUMMARY OF THE INVENTION

The present invention provides a system capable of quickly surveilling any change of status occurring in the terminal units 2, while said system transmits data by synchronously mixing the high frequency AC signal into the AC commercial frequencies of the power line. A preferred embodiment of the present invention provides a central processing unit (CPU) 1 and a plurality of branching terminal units connected to the CPU via the power line, while a high frequency AC signal is synchronously mixed into the AC commercial frequency of the power line to enable the control signal to be transmitted so that the terminal units can execute any desired operation.

The preferred embodiment of the present invention provides a data transmission system via the power line, which normally samples the status of terminal units and surveilles these by polling means, while it comprises means for transmitting an emergency data signal from any desired terminal unit during a specific commercial frequency cycle after the polling signal is output, means for generating a contention for an available transmission line between terminal units to send an emergency data signal, means for resolving the contention in favor of the emergency data signal, and means for receiving said emergency data signal into the CPU synchronous with the specific AC commercial frequency cycle after said polling signal is output.

According to the present invention, after the data sampling is executed by polling means, a specific AC commercial frequency cycle period can be allocated for transmitting emergency data between a plurality of terminal units via contention, and as a result, any change of status occuring in the terminal units can quickly be transmitted to the central processing unit using a slow-speed transmission line, while all the control signals from the central processing unit can also be transmitted to each terminal unit without being held waiting.

DETAILED DESCRIPTION OF THE INVENTION

In reference to FIGS. 4 through 9, a preferred embodiment of the present invention is described below.

Figure 1:
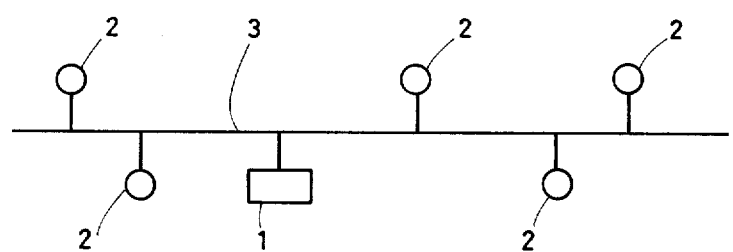
FIG. 1 shows a simplified diagram of a conventional data transmission system using the power line.
Figure 2:
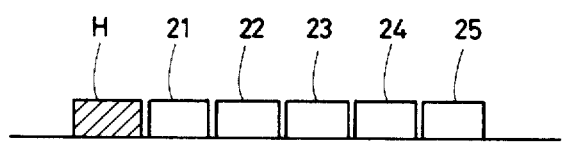
FIG. 2 is a timing chart describing the existing time division stationary allocation system.
Figure 3:
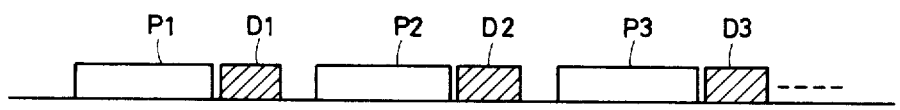
FIG. 3 is a tiing chart describing the existing poling system.
Figure 4:
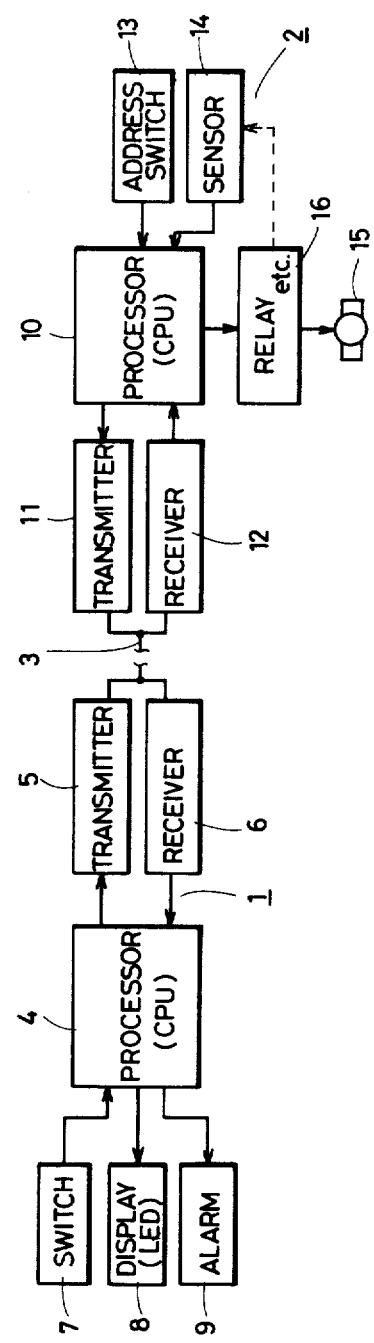
FIG. 4 shows a simplified block diagram of a typical composition including the CPU and terminal units as a preferred embodiment of the present invention.

FIG. 4 shows a simplified block diagram of a typical composition including the central processing unit (CPU) 1 and a plurality of terminal units 2. Although there is only one of terminal unit 2 in the drawing, many of them can also be connected to the system via the power line 3, as illustrated in FIG. 1. Central processing unit 1 comprises a microprocessor 4, a transmitter 5, a receiver 6, a switching unit 7, a display unit 8, and an alarm unit 9. Switching unit 7 has switches instructing every terminal unit to perform ON/OFF operations.

Figure 5:
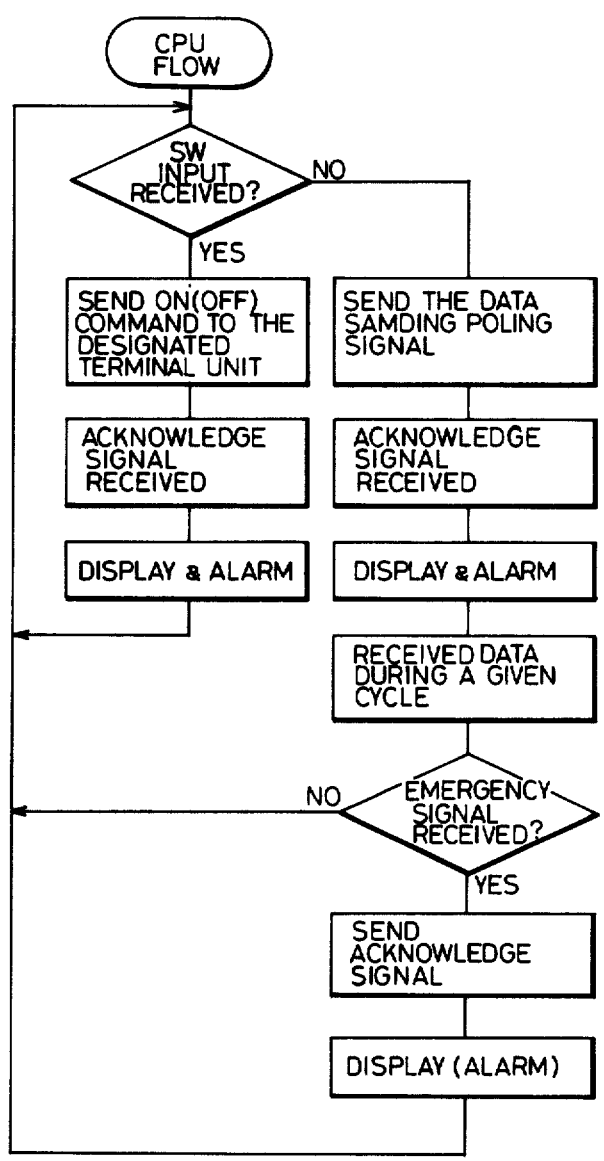
FIG. 5 is a flowchart describing operations of the central processing unit.
Figure 6:
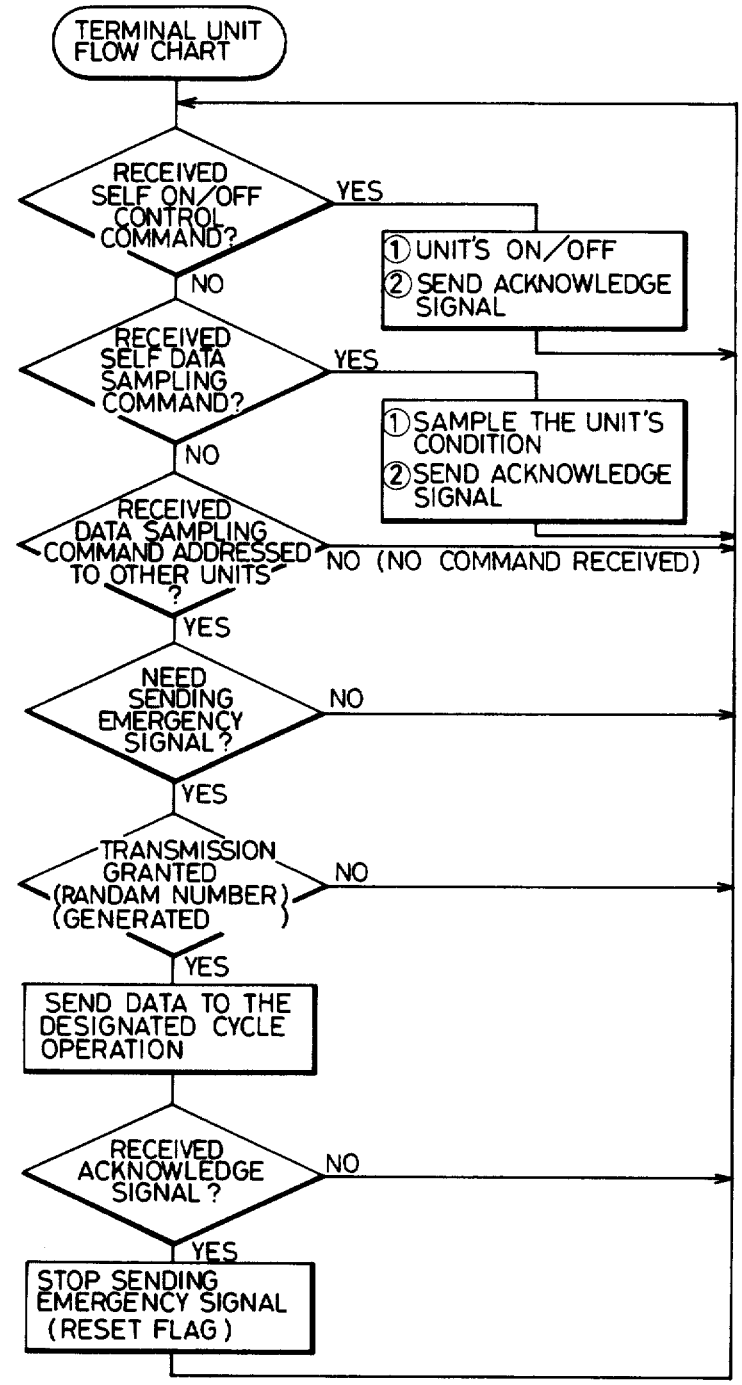
FIG. 6 is a flowchart describing operations of the terminal units.

Display unit 8 displays the actual status of the terminal units 2 connected by means of LED, CRT, and lamps. Alarm unit 9 generates alarm sound, for example, by buzzer, if any abnormal condition arises at any of the connected terminal units 2. Each of the terminal units 2 is also provided with a microprocessor 10, transmitter 11, and receiver 12. Addressing switch unit 13 provides each terminal unit 2 with independent addresses. Sensor unit 14 confirms the operation of such a unit as motor 15 is being controlled by other units. Such a unit as motor 15 is being controlled, for example, by a load controller such as a relay shown in FIG. 4, which turns the unit 15 ON and OFF. FIG. 5 is a flow-chart describing operations of the central processing unit 1, while FIG. 6 is also a flowchart describing operations of the terminal units 2.

Figure 7:
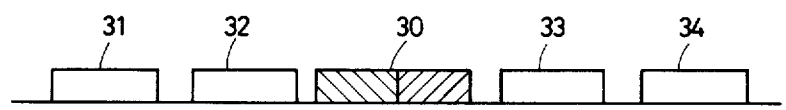
FIG. 7 is a timing chart describing the relationship between the data samples and the periods for receiving and transmitting the control command.

Normally, while no input is being fed from the switching unit 7, the CPU 1 periodically executes a data sampling operation via the polling system as described later on. In FIG. 7, symbols 31 through 34 respectively show the data sampling cycle. If a switch responding to any desired terminal unit 2 is operated, an ON/OFF control command will be transmitted from the CPU 1 to the designated terminal unit 2 by preferentially preceding all other data being sampled. Symbol 30 of FIG. 7 shows a period in which such a control command is either transmitted or received, and during this period, all the data sampling operations are inhibited, which can be restored only after the control command delivery period is terminated.

As soon as the CPU 1 receives an input from the switching unit 7, the CPU outputs the ON/OFF control command to the designated terminal unit 2, which then identifies whether the received ON/OFF control command has been addressed to itself, and if so, it starts to control the ON/OFF operations of the related devices and simultaneously sends out an ACKNOWLEDGE signal to the CPU 1. On receipt of this signal, the CPU 1 decodes its contents and then displays the existing condition of the designated terminal unit 2 in the display unit 8.

The period needed for the delivery of the control command for the ON/OFF operation of the terminal units is as described above, where the time actually needed for waiting until the command signal is output corresponds to one cycle of the data sampling cycle, being very short in effect.

Figure 8:
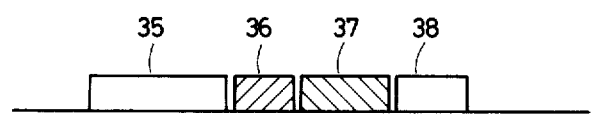
FIG. 8 is a timing chart describing a typical mode when the data is being sampled.

FIG. 8 shows a timing chart during the data sampling operation, which actually corresponds to one of the cases denoted by symbols 31 through 34 of FIG. 7. In reference to the timing chart of FIG. 8 and the flowcharts of FIGS. 5 and 6, data sampling operation is described below.

In FIG. 8, symbol 35 is a polling signal delivered from the CPU 1 to a specific terminal unit 2. The terminal unit 2 first identifies that the polling signal has been addressed to itself, and then samples the present status for encoding and delivers the answerback signal to the CPU 1 as ACKNOWLEDGE signal 36. Symbol 37 is an emergency signal fed from one of the terminal units 2 other than said specfic one, where said emergency signal is output from one of the terminal units in a specific timing after the poling signal 35 has been detected using a line contention technique, indicating that an abnormal condition exists in one of said terminal units 2. Symbol 38 denotes the ACKNOWLEDGE signal output from the CPU 1 in responding to said emergency signal.

The CPU 1 receives the ACKNOWLEDGE signal from a designated terminal unit 2 from the polling technique, then displays the actual state of the terminal unit 2 and generates an alarm. The CPU 1 however provides a period for permitting the sampled data to be received during a predetermined cycle. If a data received by the CPU 1 is identified as an emergency signal, the CPU 1 outputs an ACKNOWLEDGE signal to the terminal unit 2 which sent such an emergency signal to the CPU 1. The CPU 1 then changes the display contents and simultaneously generates an alarm. If the terminal unit 2 receives an instruction to deliver the sampled data to other units, it first identifies whether an emergency signal should be output from itself, and if found necessary, it sets a flag and outputs the emergency data to a specific cycle position corresponding to the data receiving period of the CPU 1. On receipt of the ACKNOWLEDGE signal from the CPU 1, the terminal unit 2 resets and stops, to output such an emergency signal.

Even when the CPU has applied polling means for sampling data from other terminal units 2, such an emergency signal can be output very quickly by using the time slot available for sampling data.

The CPU 1 may substitute the terminal unit 2 which delivered an emergency signal for the ACKNOWLEDGE 38, by polling said terminal unit 2. If no emergency signal is generated, neither the CPU nor any terminal unit exchanges such an emergency signal, and so they can delete the ACKNOWLEDGE period in order to perform the next data sampling during a specific safety period.

Figure 9:
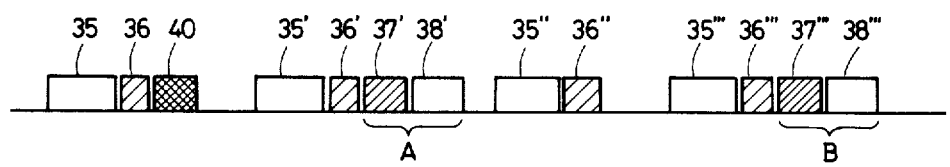
FIG. 9 is a timing chart describing the recovery process when an emergency signal collides with others.

FIG. 9 shows a chart describing the recovery process if a collision took place between emergency signals from the two terminal units 2A and 2B. In FIG. 9, symbols 35, 35', 35'', and 35''' denote the polling signals output from the CPU 1 for normal data sampling operations, whereas symbols 36, 36', 36'', and 36''' are the ACKNOWLEDGE data output from the corresponding terminal units 2. All the emergency signals are preliminarily encoded so that they cannot be decoded when collided with each other. Actually, these signals can easily be encoded. For example, when emergency signals A and B collide with each other at the position 40 of FIG. 9, since the CPU 1 cannot decode both signals, it executes the polling for sampling the next data by ignoring these emergency signals. As shown in the flowchart of FIG. 6, the terminal units 2A and 2B which respectively generated the emergency signals will continuously output emergency signals if no AC-KNOWLEDGE signal is fed from the CPU 1, until they eventually receive the ACKNOWLEDGE signals by any means such as a random delay, or until the unit themselves are subjected to the polling.

Random delay means enables the system to properly adjust the time needed for waiting to cause the intended operations to be repeatedly performed by using the random digit table. In the embodiment of the present invention, such a random delay operation corresponds to the act of repeating operations while determining whether such an emergency signal should be output during the ensuing polling operations. Using this means, collided emergency signals A and B can eventually be separated to allow only the normal emergency signal to be transmitted. In FIG. 9, only the terminal unit A outputs an emergency signal at the position 37', whereas the unit B outputs an emergency signal at the position 37''', and as a result, these units A and B respectively receive the ACKNOWLEDGE signals 38' and 38''' so that the system can recover from the effect of the collision. According to the simulative operations using a computer, it was confirmed that the mean time can effectively be shortened unless there are many fractional numbers of the collision, although the mean time needed for recovering from the effect of the collision is dependent on the algorithm of the random number generation.

The present invention thus described in reference to the annexed drawings will obviously be suggestive of any derivation or modification from the spirit and scope contained therein by those skilled in the arts. It should be understood, however, that the present invention is not limitative of the spirit and scope described above, but is solely inclusive of such derivations and/or modifications within the spirit and scope of the following claims.

What is claimed is:

1. A data transmission system including a central processing unit for surveilling a plurality of terminal units, said central processing unit being connected to each terminal unit via a power supply line therefore, means for synchronously mixing a high frequency AC signal into the AC commercial frequency on the power supply line so that data transmission may be performed along said line and the normal and emergency conditions of each terminal unit may be surveilled, the improvement comprising:

means within said central processing unit for selectively sending polling signals to each terminal unit to initiate transmission of normal condition data therefrom;

means withn each terminal unit responsive to a specific polling signal for transmitting said normal condition data to said central processing unit at spaced intervals via said power supply line;

emergency data transmission means within each terminal unit for synchronously transmitting emergency data to the central processing unit via said power supply line during a specific AC commercial frequency cycle between said polling signals;

means in said central processing unit for sensing emergency data only during said specific AC commercial frequency cycles and identifying only valid enegency data associated with one of said terminal units and means in said central processing unit for transmitting an acknowledgement signal to said one of said terminal units only if valid emergency data is identified, the existence of valid emergency data occurring during said specific cycles only in the absence of a collision of emergency data from respective terminal units; and means within each terminal unit for resending emergency signals at random times in response to the absence of receipt of said acknowledgement signal within a predetermined time following the transmission of emergency data;

whereby the terminal units may be surveilled by a combination of polling and contention techniques.

2. The system of claim 1, each terminal unit includes a microprocessor programmed to recognize the absence of said acknowledgement signal and to resend said emergency signals at random times.

* * * * *